(12) United States Patent
Cheng

(10) Patent No.: US 7,624,604 B1
(45) Date of Patent: Dec. 1, 2009

(54) CAR STEERING WHEEL LOCKING STRUCTURE

(76) Inventor: An Chen Cheng, 1F., No. 14-1, Lane 48, Kangle St., Neihu District, Taipei City 114 (TW)

( * ) Notice: Subject to any disclaimer, the term of this patent is extended or adjusted under 35 U.S.C. 154(b) by 0 days.

(21) Appl. No.: 12/289,775

(22) Filed: Nov. 4, 2008

(51) Int. Cl.
*B60R 25/02* (2006.01)

(52) U.S. Cl. .......................................... 70/209; 70/226

(58) Field of Classification Search ............ 70/18, 70/19, 386, DIG. 9, 209, 211, 212, 225, 226, 70/237, 238
See application file for complete search history.

(56) References Cited

U.S. PATENT DOCUMENTS

| | | | | |
|---|---|---|---|---|
| 1,447,374 A * | 3/1923 | Bowzer | ........................ | 70/19 |
| 1,469,655 A * | 10/1923 | Lukens | ........................ | 70/211 |
| 3,245,239 A * | 4/1966 | Zaidener | ........................ | 70/202 |
| 3,664,164 A * | 5/1972 | Zaidener | ........................ | 70/202 |
| 5,347,836 A * | 9/1994 | Chen | ........................ | 70/209 |
| 5,426,960 A * | 6/1995 | Jan | ........................ | 70/209 |
| 5,671,619 A * | 9/1997 | Hou | ........................ | 70/209 |
| 5,836,185 A * | 11/1998 | Openiano | ........................ | 70/209 |
| 5,896,761 A * | 4/1999 | Chen | ........................ | 70/38 A |
| 5,921,120 A * | 7/1999 | Wu | ........................ | 70/209 |
| 5,924,315 A * | 7/1999 | Chang | ........................ | 70/209 |
| 5,992,190 A * | 11/1999 | Townsend | ........................ | 70/209 |
| 6,016,674 A * | 1/2000 | Yang | ........................ | 70/209 |
| 6,282,930 B1 * | 9/2001 | Strauss et al. | ........................ | 70/209 |
| 6,694,785 B1 * | 2/2004 | Hsieh | ........................ | 70/209 |
| 7,434,429 B1 * | 10/2008 | Yu | ........................ | 70/209 |
| 2001/0032485 A1 * | 10/2001 | Wu | ........................ | 70/209 |

* cited by examiner

*Primary Examiner*—Lloyd A Gall
(74) *Attorney, Agent, or Firm*—Rosenberg, Klein & Lee

(57) ABSTRACT

A car steering wheel locking structure includes a first lock hook, a second lock hook, a lock body, a lock heart, a pull rod, a cam, a ratch and a pawl. The lock heart is assembled on the lock body, the first lock hook is fixed on the lock body, the second lock hook is assembled on the pull rod, the pull rod is movably assembled on the lock body, the cam is assembled in the lock body and connects with the lock heart, the ratch is assembled on one end of the lock body by a column pin and has an extending board, the pawl is assembled in the lock body by a fixing shaft and mates with the ratch, one side of the first spring contacts with a claw portion of the pawl, and a tail portion of the pawl is driven to move by rotating the cam.

6 Claims, 18 Drawing Sheets

CAR STEERING WHEEL LOCKING STRUCTURE

BACKGROUND OF THE INVENTION

1. Field of the Invention

The present invention relates to a car steering wheel locking structure, and particularly relates to a car steering wheel locking structure fixed on a steering wheel without being disassembled.

2. Description of Related Art

Various types of steering locks have been disclosed for locking up a car steering wheel. The first prior art illustrates a steering lock according to the prior art, which is to lock up a car steering wheel by securing it to a brake pedal. Fastening a car steering wheel to a brake pedal by a steering lock may increase the stroke of a brake pedal easily. Extending the stroke of a brake pedal may cause spongy brake pedal problem. Further, this type of steering lock is complicated to install and requires much space to store. Once it is fastened in place to lock up a car steering wheel, it will hinder a driver from moving in or out of a car.

The second prior art illustrate another two different steering locks according to the prior art. These two different steering locks are similar in functional structure. They commonly have an extension bar secured to a car steering wheel by two hooks, which extension bar will be stopped against a certain part inside a car when the car steering wheel is rotated through a wide angle. Disadvantages of these steering locks are numerous. Because different cars have different inner spaces, the extension bar must be long enough to fit all cars. Extended size of extension bar requires much space to store when it is not in use. In order to reduce space occupation, the extension bar must be adjustable. However, this adjustable design makes the structure of a steering lock complicated and expensive to manufacture. Still another disadvantage of the above-mentioned types of steering locks is that they are not suitable for locking the steering wheel of a sports car that does not have circumscribed circle around the horn button thereof. Installation of these types of steering locks on a car steering wheel is critical. Fastening a steering lock on a car steering wheel in an improper position may allow a car steering wheel to be rotated through a wide range of angle. Further, in either of the known structures of steering lock, there is no means to protect against insertion of a pry tool.

SUMMARY OF THE INVENTION

One particular aspect of the present invention is to provide a car steering wheel locking structure. No matter a user uses or does not use the car steering wheel locking structure, the car steering wheel locking structure can be fixed on a steering wheel without being disassembled.

In order to achieve the above-mentioned aspects, the present invention provides a car steering wheel locking structure, comprising a first lock hook, a second lock hook, a lock body, a lock heart, a pull rod, a cam, a ratch and a pawl. The lock heart is assembled on the lock body, the first lock hook is fixed and assembled on the lock body, the second lock hook is assembled on the pull rod, the pull rod is movably assembled on the lock body, the cam is assembled in the lock body and connects with the lock heart, the ratch is assembled on one end of the lock body by a column pin, the ratch has an extending board, the pawl is assembled in the lock body by a fixing shaft, the pawl mates with the ratch, the lock body has a spring hole for receiving a first spring, one side of the first spring contacts with a claw portion of the pawl, and a tail portion of the pawl is driven to move by rotating the cam.

The lock body has a card piece, the card piece has a through hole formed thereon, the pull rod passes through the lock body and the through hole, the cam is assembled in the lock body, one side of the card piece is disposed inside a groove of the cam, a second spring is disposed inside the lock body, and the second spring contacts with one side of the card piece.

The groove of the cam has a width portion and a narrow portion communicated with each other by a sliding face.

The lock body has a first long hole formed therein for receiving a plurality of steel balls, the cam has a first concave groove formed thereon, the steel balls mate with the concave groove, and the steel ball contacts with the tail portion of the pawl.

The cam has a first concave groove formed thereon, a roller is disposed between the pawl and the cam, and the column surface of the roller mates with the concave groove of the cam and contacts with the tail portion of the pawl.

The car steering wheel locking structure further includes a warning device assembled on the top side of the lock body and the warning device having a switch. When the extending board and the lock body are folded, the extending board contacts to the switch in order to turn off the warning device.

When the car steering wheel locking structure is adjusted and fixed on the steering wheel, the extending board is opened in order to abut against the car steering wheel base and lock the steering wheel. When using a key to open the car steering wheel locking structure to make the pawl to release the ratch, the extending board can be folded and separate from the steering wheel. However, the car steering wheel locking structure still be fixed on the steering wheel. Because the car steering wheel locking structure has a small size and a light weight, the car steering wheel locking structure does not affect the user to operate the steering wheel and does not affect an air bag to be sprung out.

It is to be understood that both the foregoing general description and the following detailed description are exemplary, and are intended to provide further explanation of the invention as claimed. Other advantages and features of the invention will be apparent from the following description, drawings and claims.

BRIEF DESCRIPTION OF THE DRAWINGS

The various objects and advantages of the present invention will be more readily understood from the following detailed description when read in conjunction with the appended drawings, in which.

DETAILED DESCRIPTION OF PREFERRED EMBODIMENTS

Figure 1:
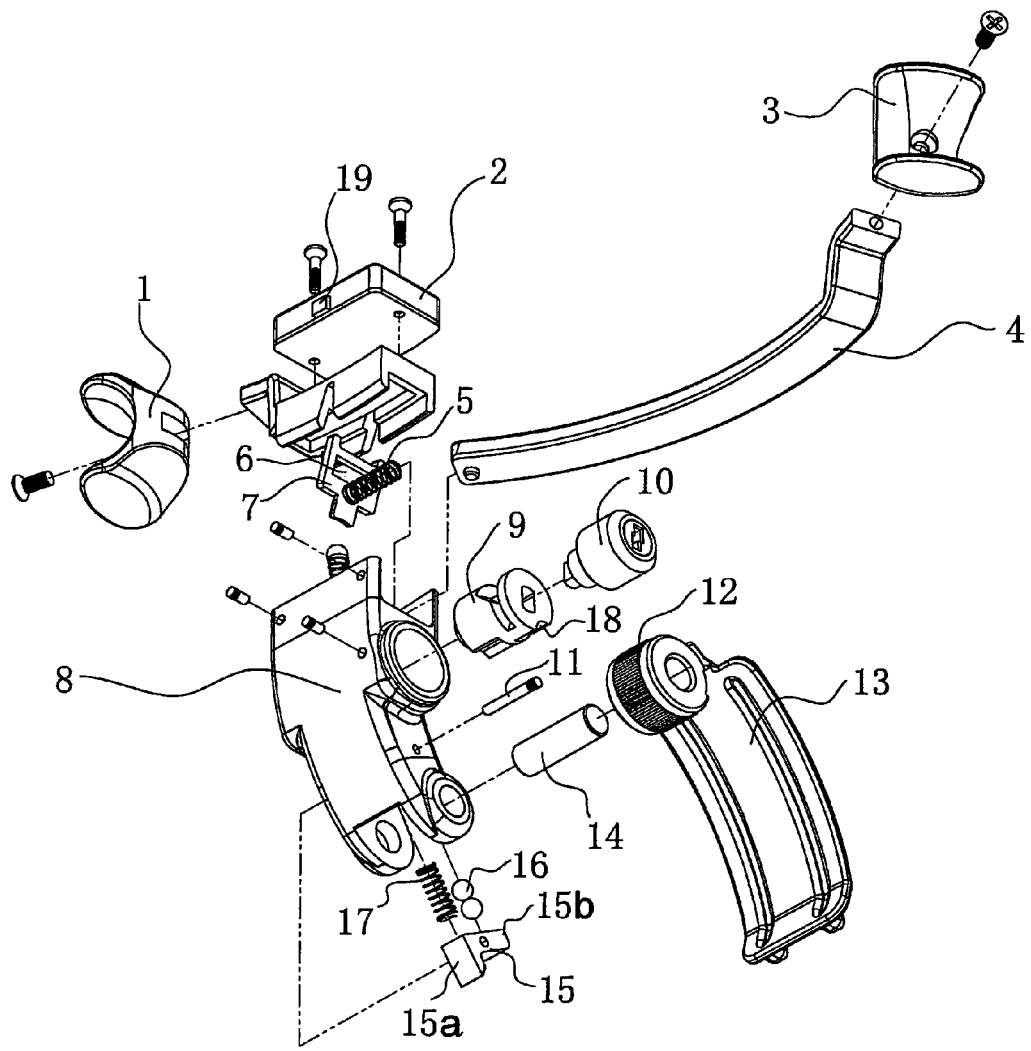
FIG. 1 is an exploded, schematic view of a car steering wheel locking structure of the present invention.
Figure 17:
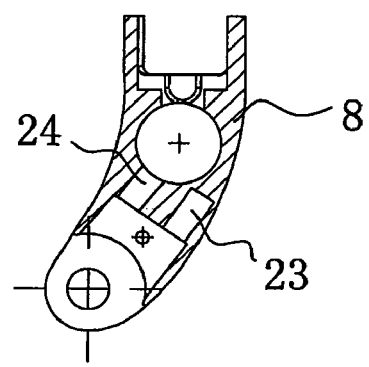
FIG. 17 is a cross-sectional view along line B-B of a lock body of the present invention shown in FIG. 15.
Figure 18:
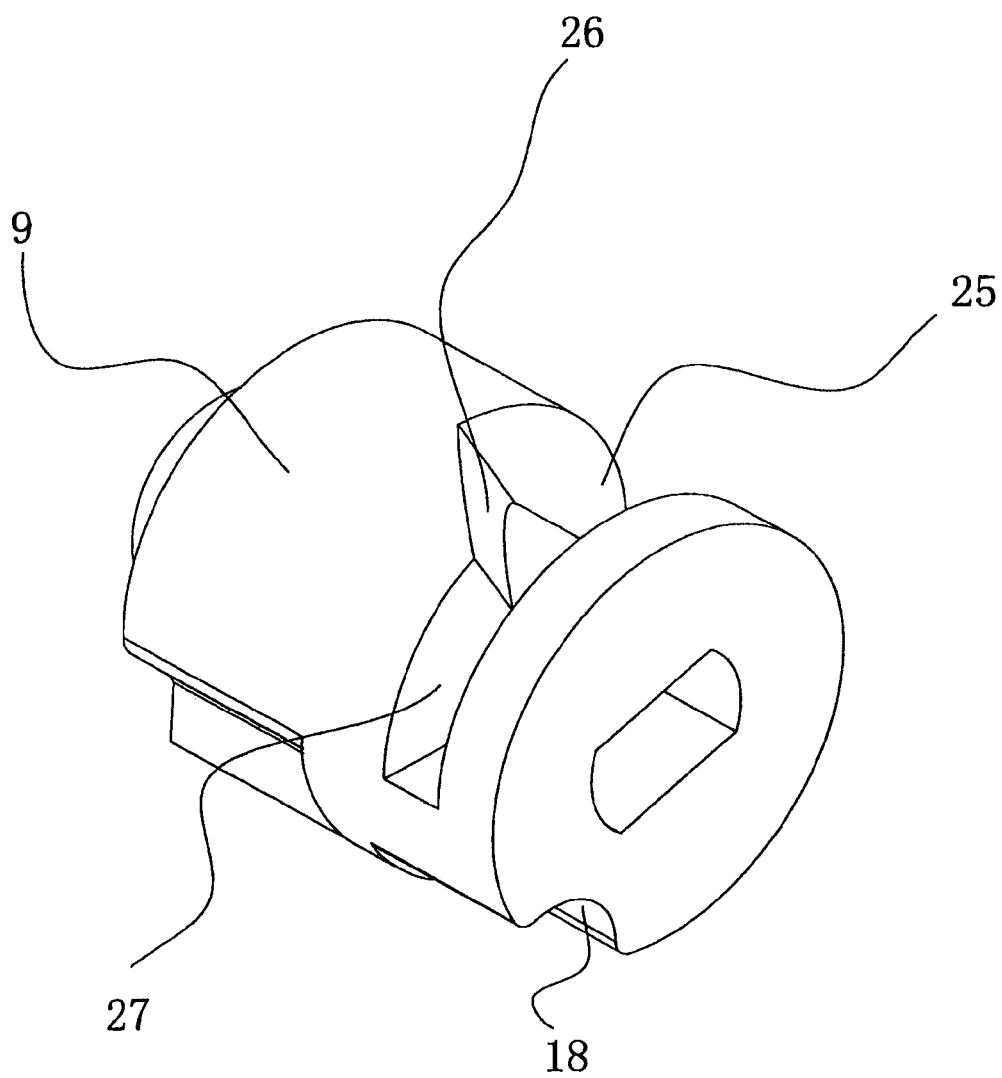
FIG. 18 is a perspective view of a cam of the present invention.

Referring to FIG. 1, the present invention provides a car steering wheel locking structure includes a first lock hook 1, a second lock hook 3, a lock body 8, a lock heart 10 and a pull rod 4. The lock heart 10 is assembled on the lock body 8. The first lock hook 1 is fixed and assembled on the lock body 8. The second lock hook 3 is assembled on the pull rod 4. The lock body 8 has a card piece 7, and the card piece 7 has a through hole 6 formed thereon. The through hole 6 can be a square hole. The pull rod 4 passes through the lock body 8 and the through hole 6. A cam 9 is assembled in the lock body 8. One side of the card piece 7 is disposed inside a groove of the cam 9. A second spring 5 is disposed inside the lock body 8. The second spring 5 contacts with one side of the card piece 7, so that the pull rod 4 can be movably assembled on the lock body 8. Hence, the present invention can mate with any type of car. The groove of the cam 9 has a width portion 25 and a narrow portion 27 communicated with each other by a sliding face 26 (as shown in FIG. 18). The cam 9 connects with the lock heart 10. A ratch 12 is assembled on one end of the lock body 8 by a column pin 14, and the ratch 12 is rotatable relative to the lock body 8 by the column pin 14. The ratch 12 has an extending board 13. A pawl 15 is assembled in the lock body 8 by a fixing shaft 11. The pawl 15 mates with the ratch 12. The lock body 8 has a spring hole 23 (as shown in FIG. 17) for receiving a first spring 17. One side of the first spring 17 contacts with a claw portion 15a of the pawl 15. The tail portion 15b of the pawl 15 can be driven to move by rotating the cam 9, as follows: the lock body 8 has a first long hole 24 formed therein for receiving a plurality of steel balls 16. The cam 9 has a first concave groove 18 formed thereon. The steel balls 16 mate with the concave groove 18. The steel ball 16 contacts with the tail portion 15b of the pawl 15. When the lock heart 10 is rotated to rotate the cam 9, the steel balls 16 can separated from or received in the first concave groove 18 of the cam 9 in order to drive the tail portion 15b of the pawl 15 to move. Another method for rotate the cam to drive the tail portion 15b of the pawl 15 to move is shown as follows: a roller is disposed between the pawl 15 and the cam 9. The column surface of the roller mates with the concave groove 18 of the cam 9 and contacts with the tail portion 15b of the pawl 15. When the lock heart 10 is rotated to rotate the cam 9, the roller can separated from or received in the first concave groove 18 of the cam 9 in order to drive the tail portion 15b of the pawl 15 to move.

A warning device 2 is assembled on the top side of the lock body 8, and the warning device 2 has a switch 19. When the extending board 13 and the lock body 8 are folded, the extending board 13 contacts to the switch 19 in order to turn off the warning device 2.

Figure 2:
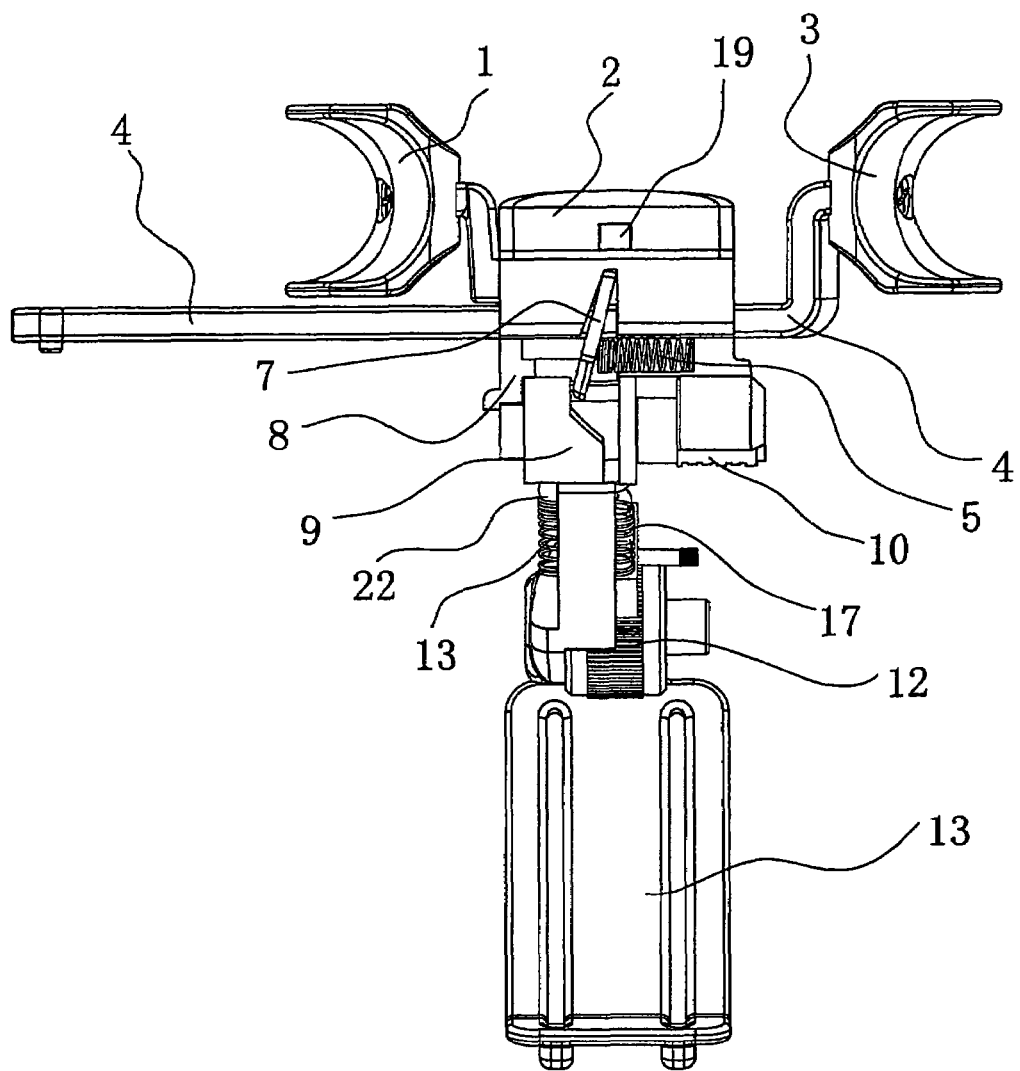
FIG. 2 is a first lateral view of a car steering wheel locking structure of the present invention.
Figure 3:
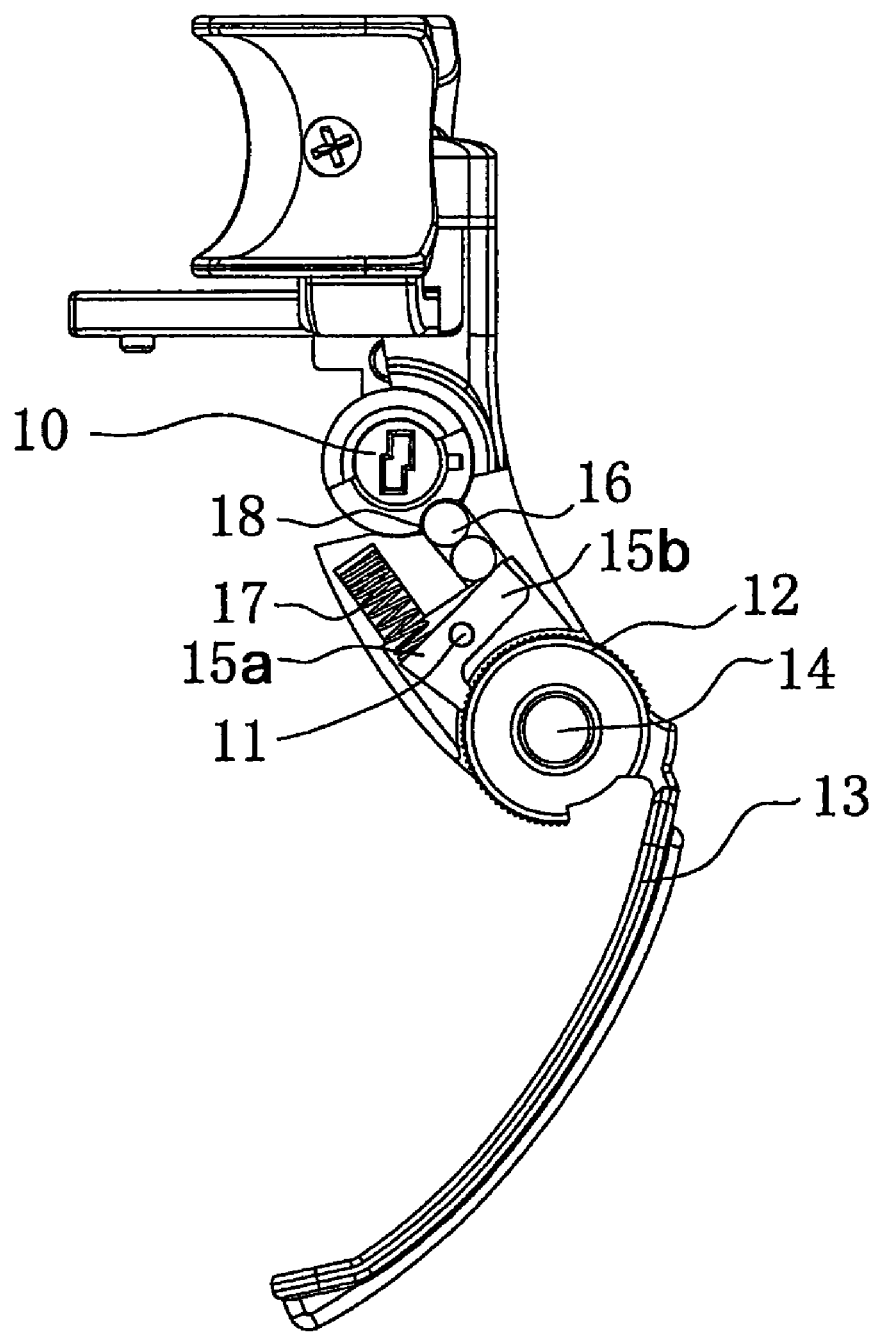
FIG. 3 is a second lateral view of a car steering wheel locking structure of the present invention.
Figure 4:
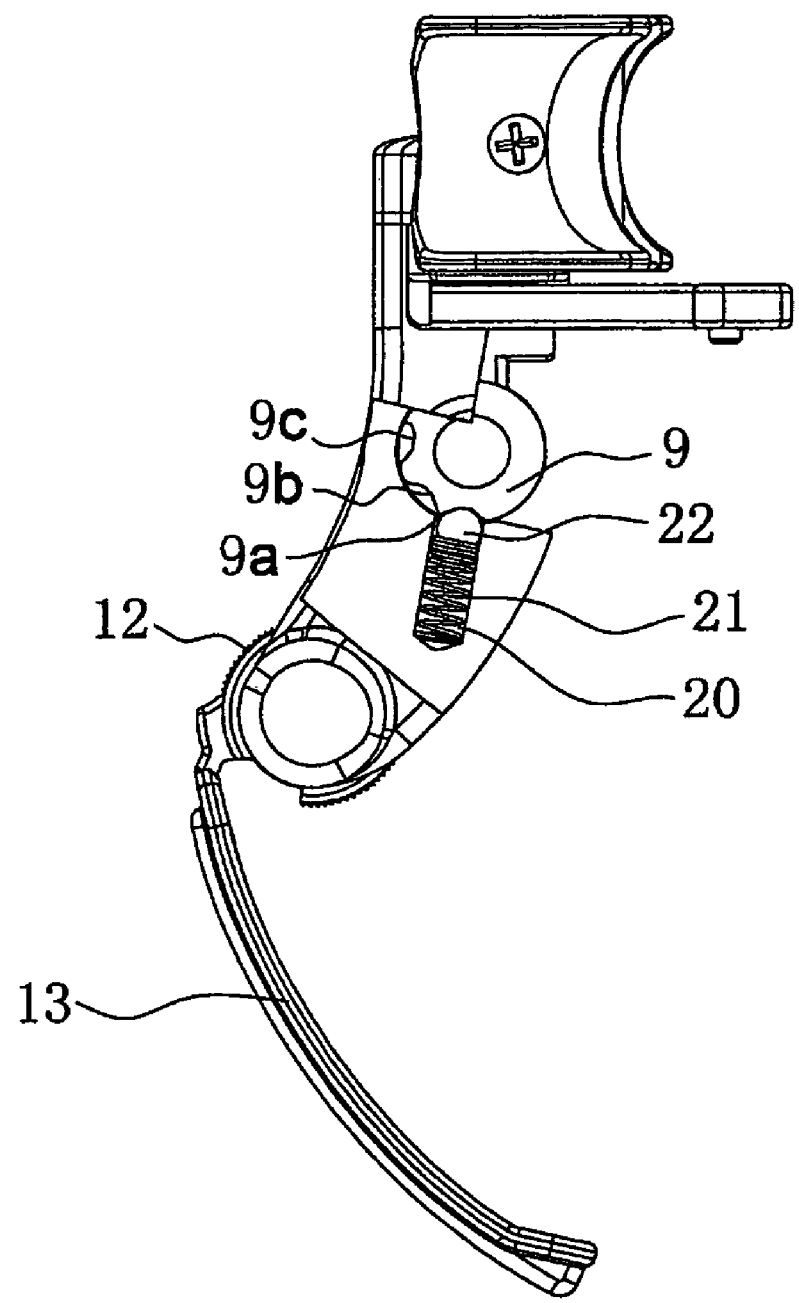
FIG. 4 is a third lateral view of a car steering wheel locking structure of the present invention.
Figure 5:
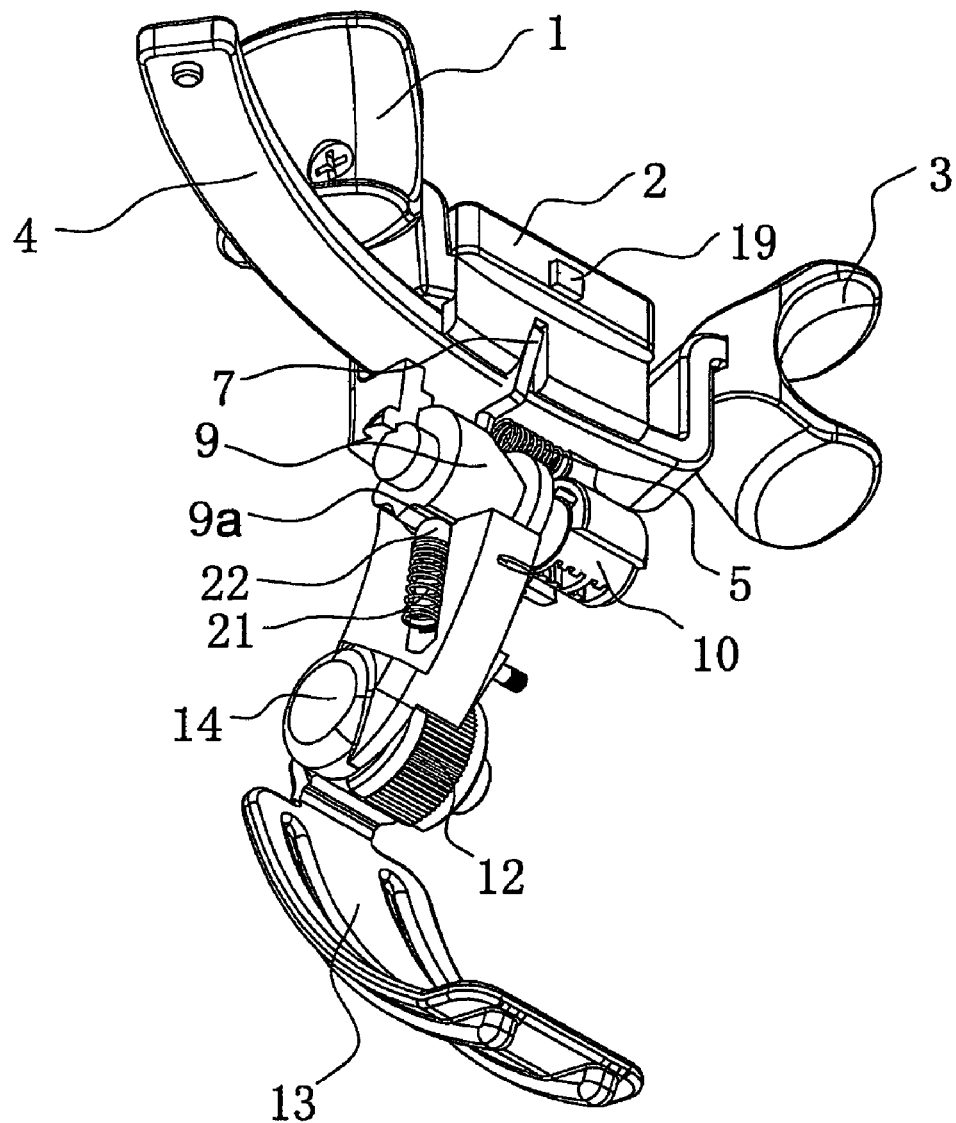
FIG. 5 is a perspective view of a car steering wheel locking structure of the present invention.
Figure 6:
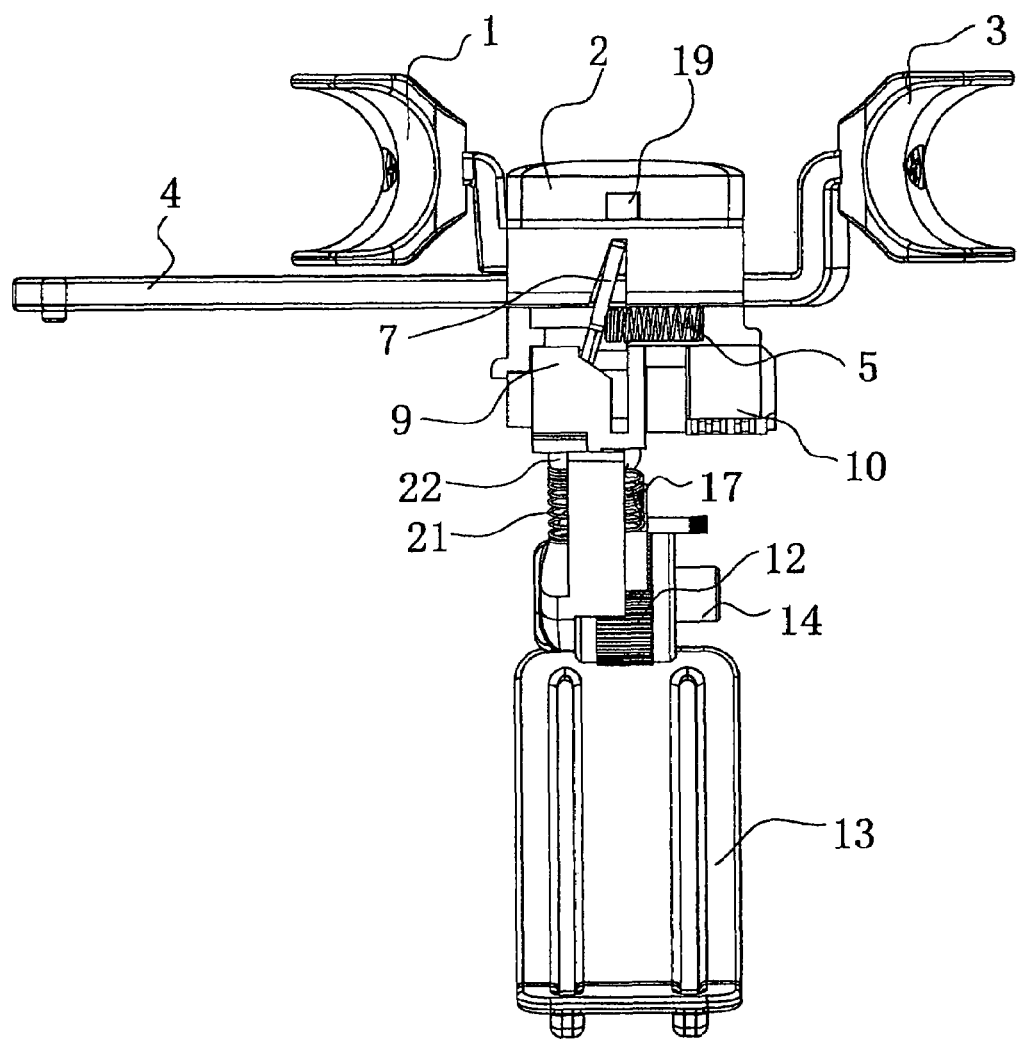
FIG. 6 is a first lateral view of a lock heart rotated by 45 degrees of the present invention.
Figure 7:
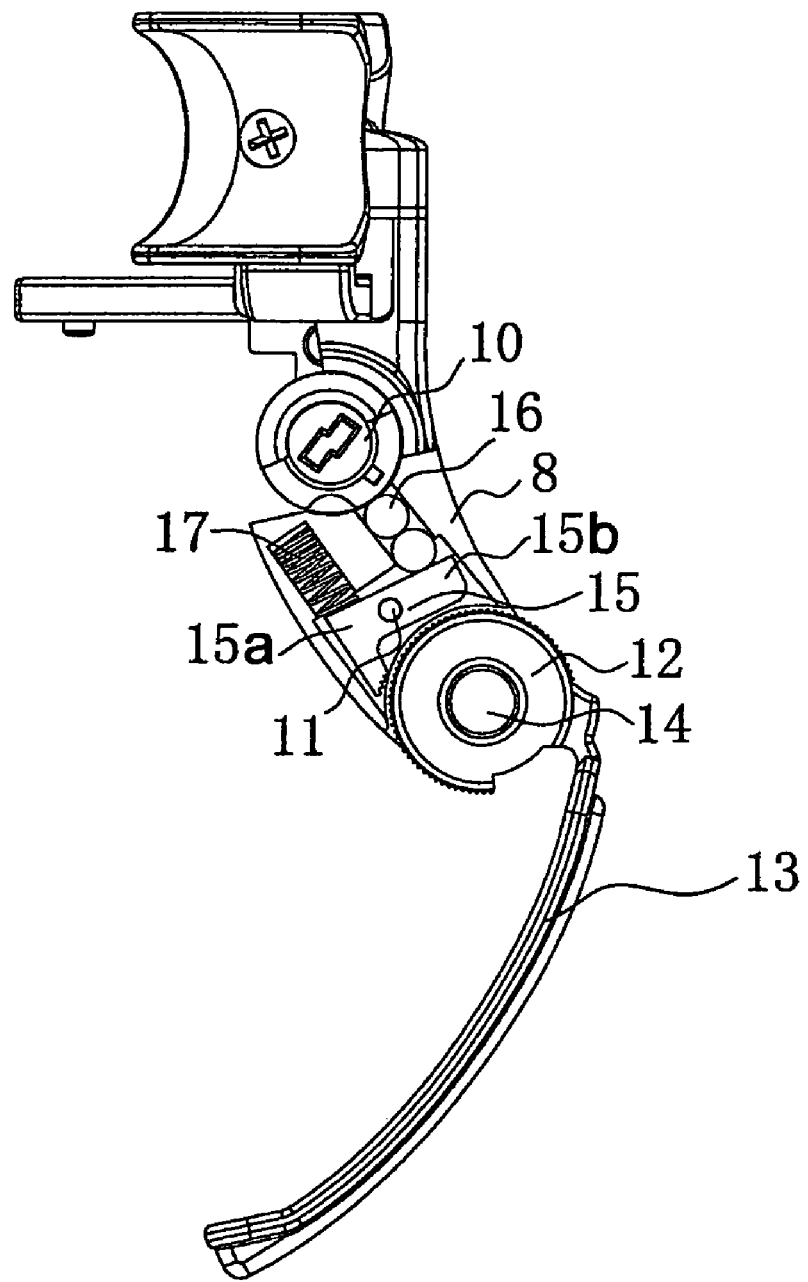
FIG. 7 is a second lateral view of a lock heart rotated by 45 degrees of the present invention.
Figure 8:
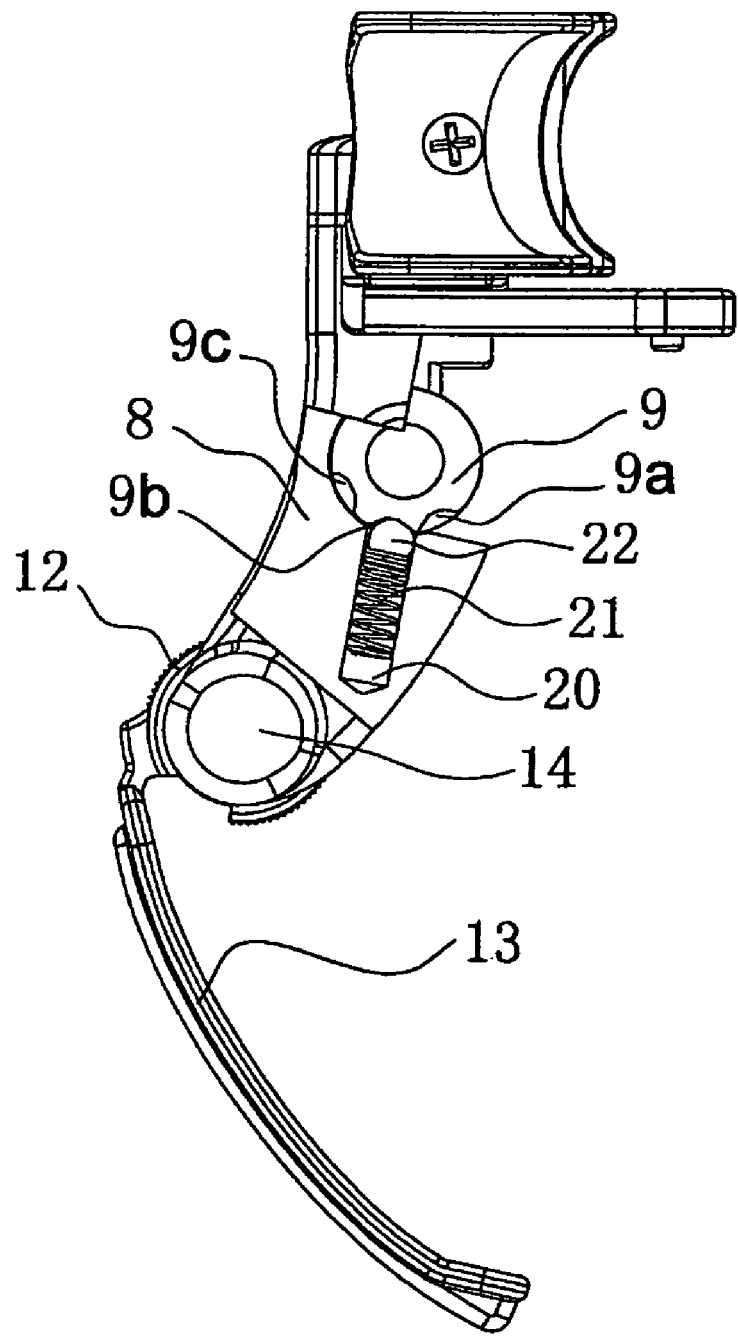
FIG. 8 is a third lateral view of a lock heart rotated by 45 degrees of the present invention.
Figure 9:
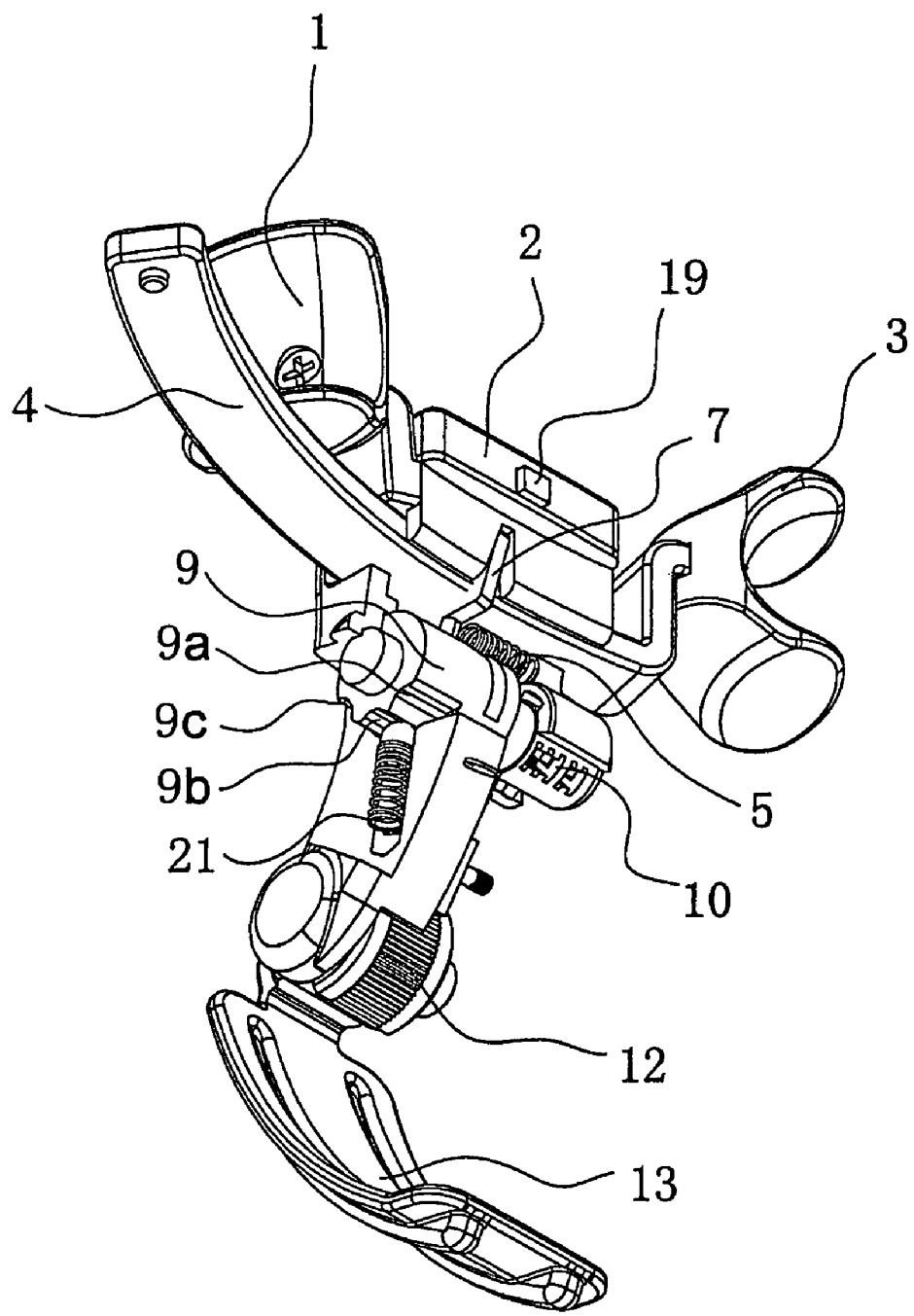
FIG. 9 is a perspective view of a lock heart rotated by 45 degrees of the present invention.
Figure 10:
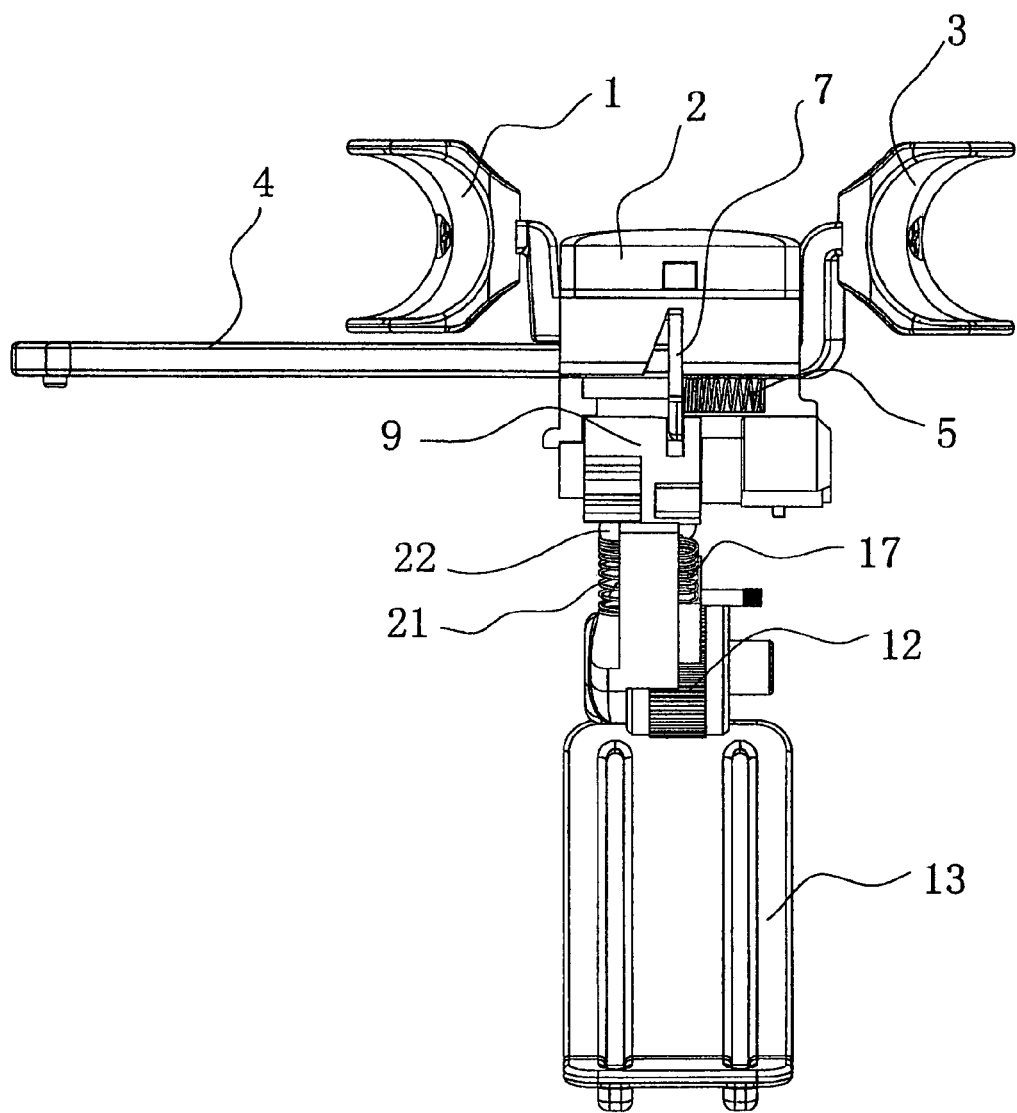
FIG. 10 is a first lateral view of a lock heart rotated by 90 degrees of the present invention.
Figure 11:
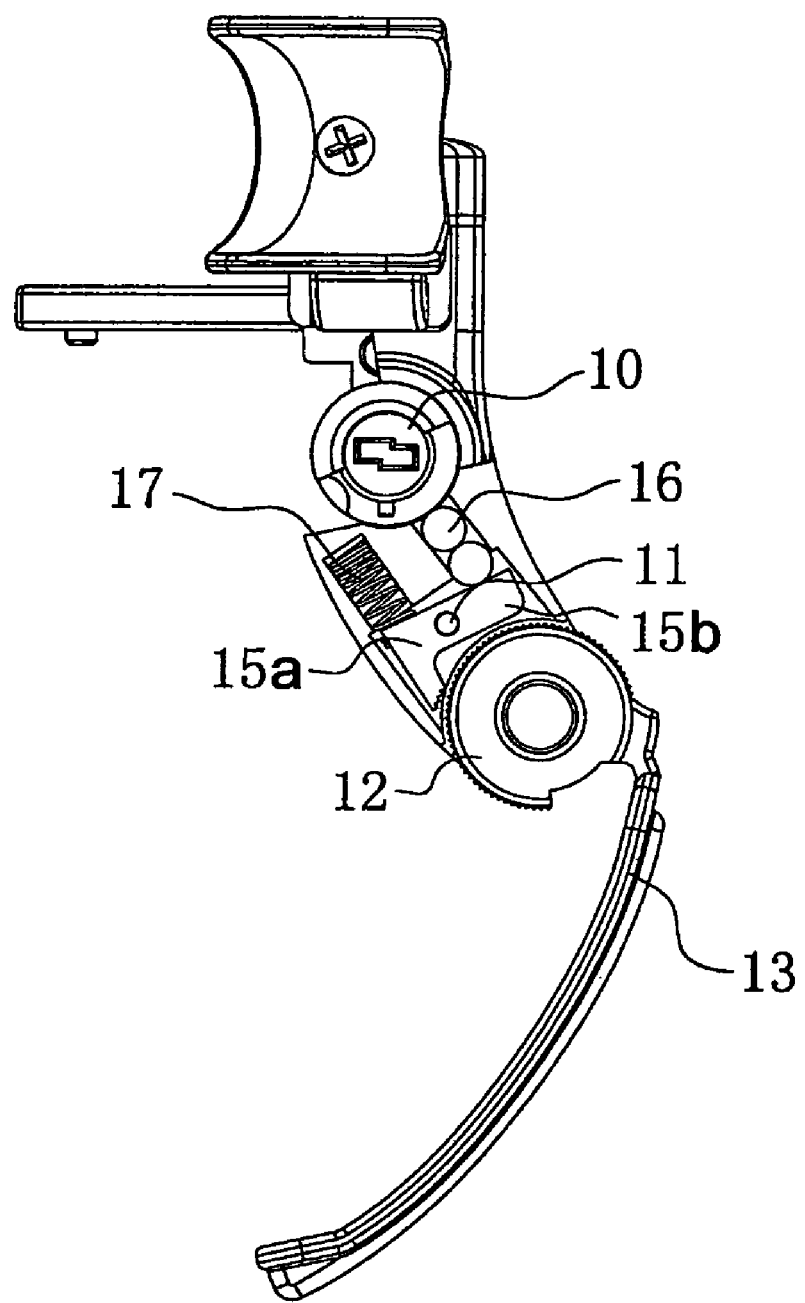
FIG. 11 is a second lateral view of a lock heart rotated by 90 degrees of the present invention.
Figure 12:
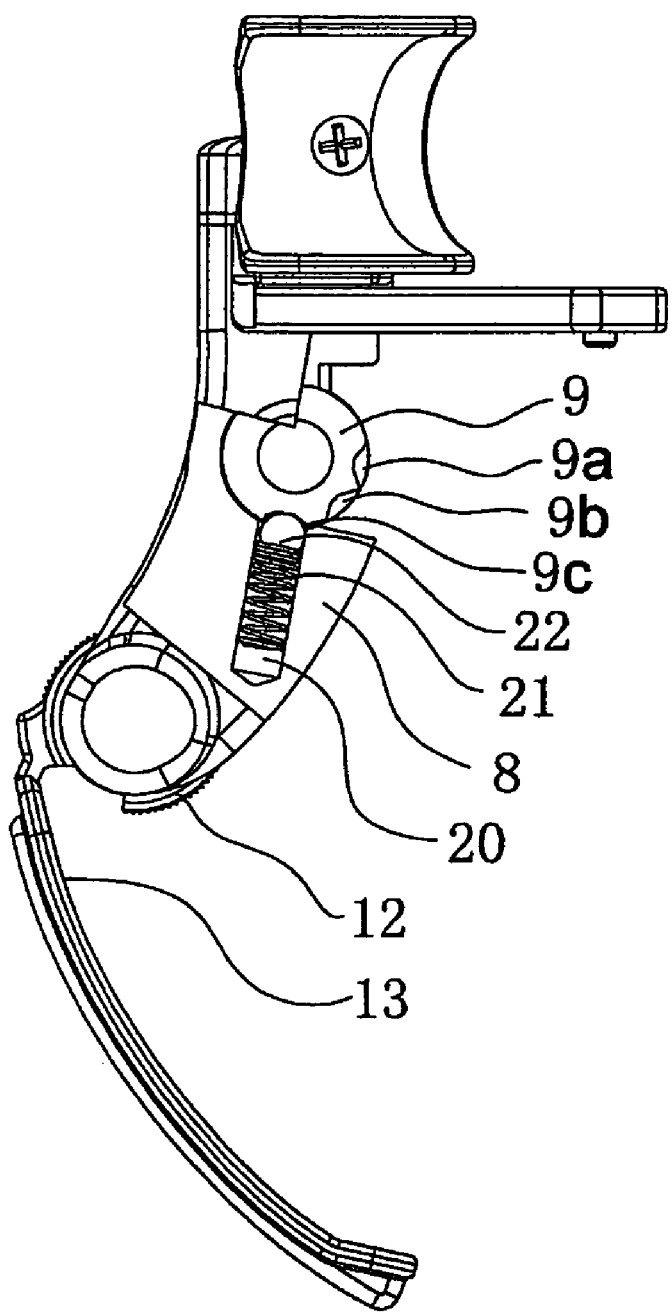
FIG. 12 is a third lateral view of a lock heart rotated by 90 degrees of the present invention.
Figure 13:
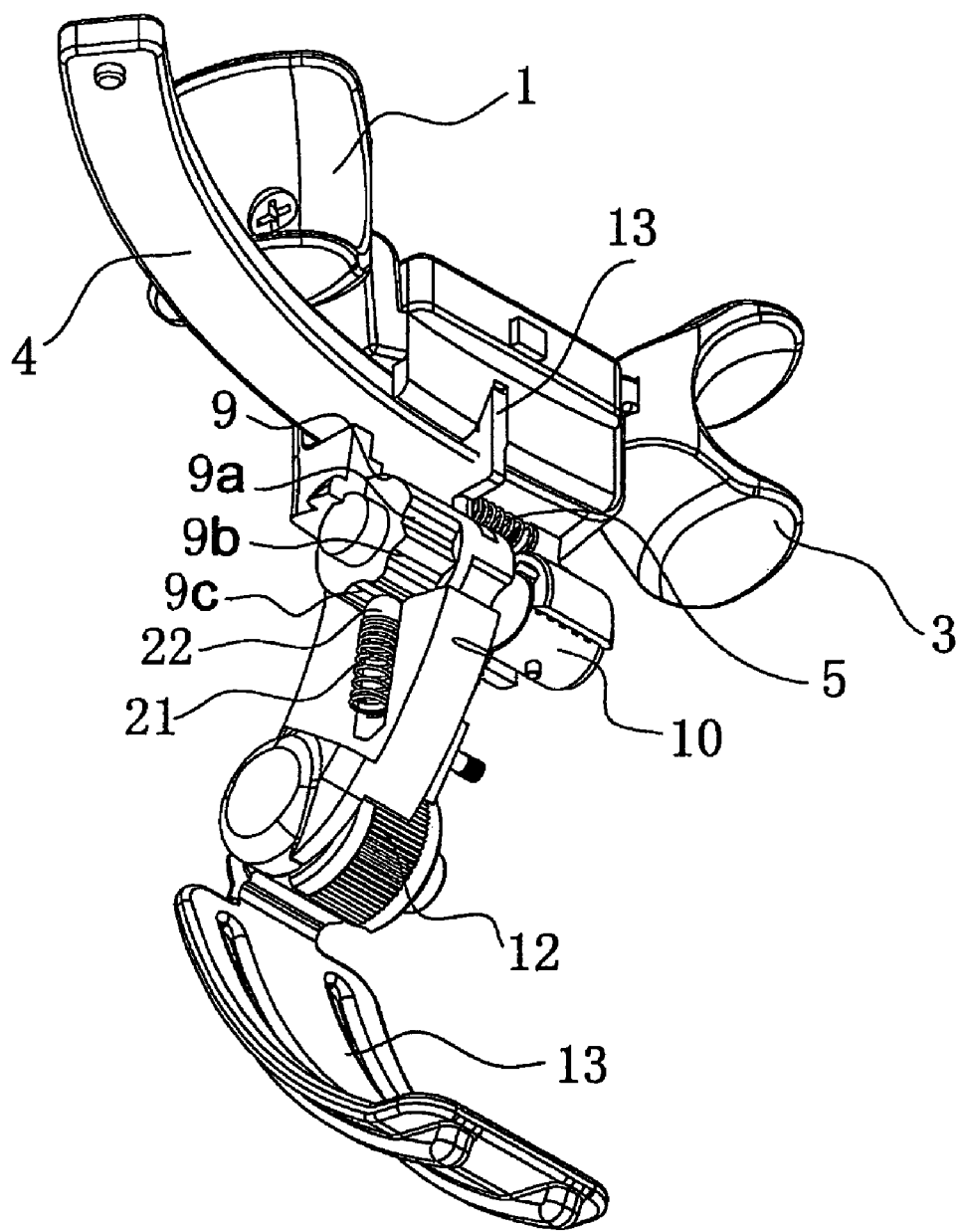
FIG. 13 is a perspective view of a lock heart rotated by 90 degrees of the present invention.
Figure 14:
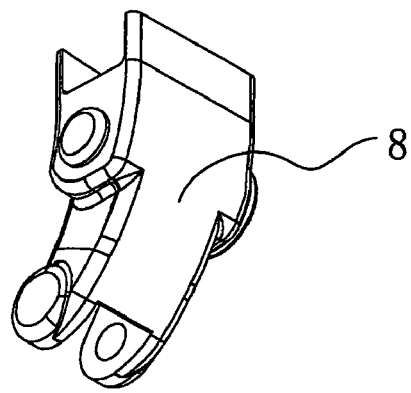
FIG. 14 is a perspective view of a lock body of the present invention.
Figure 15:
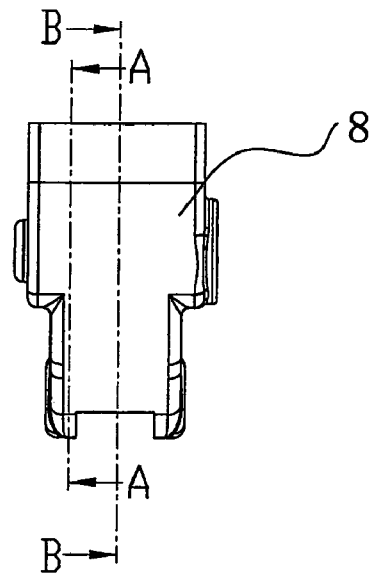
FIG. 15 is a lateral view of a lock body of the present invention.
Figure 16:
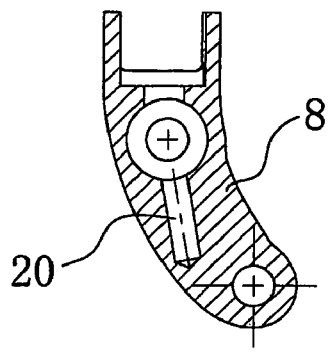
FIG. 16 is a cross-sectional view along line A-A of a lock body of the present invention shown in FIG. 15.
Figure 19:
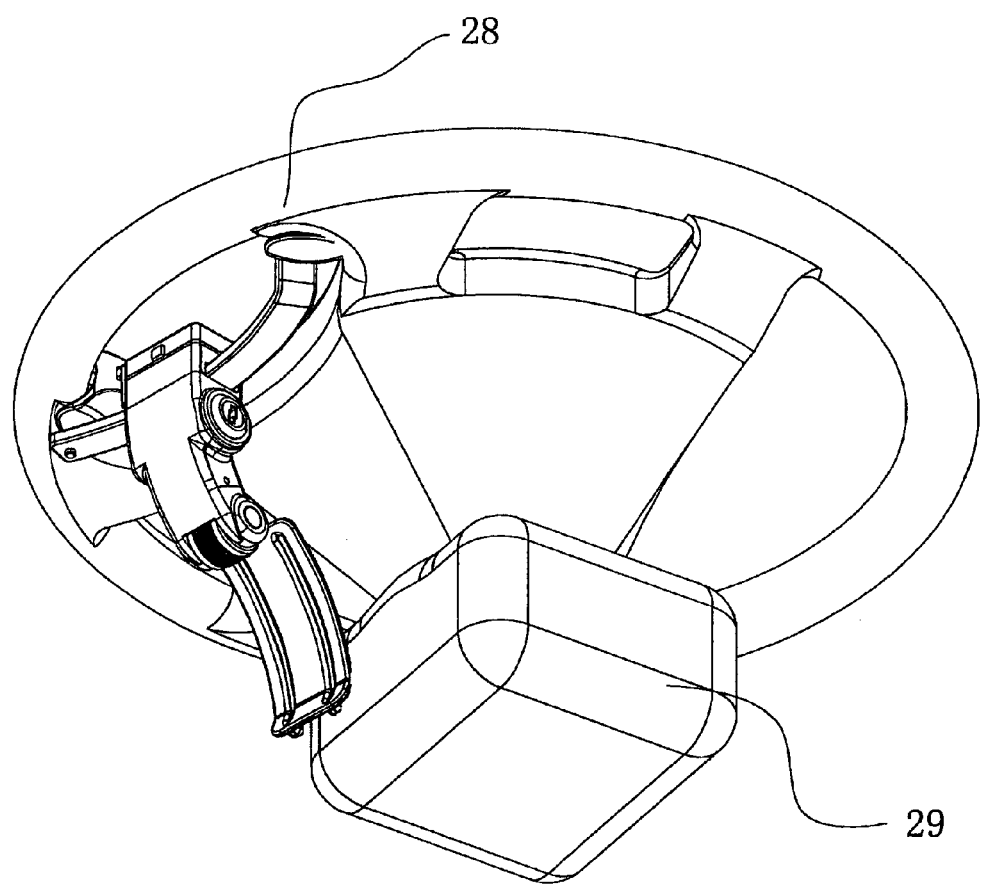
FIG. 19 is a perspective view of a car steering wheel locking structure of the present invention fixed and locked on a steering wheel.
Figure 20:
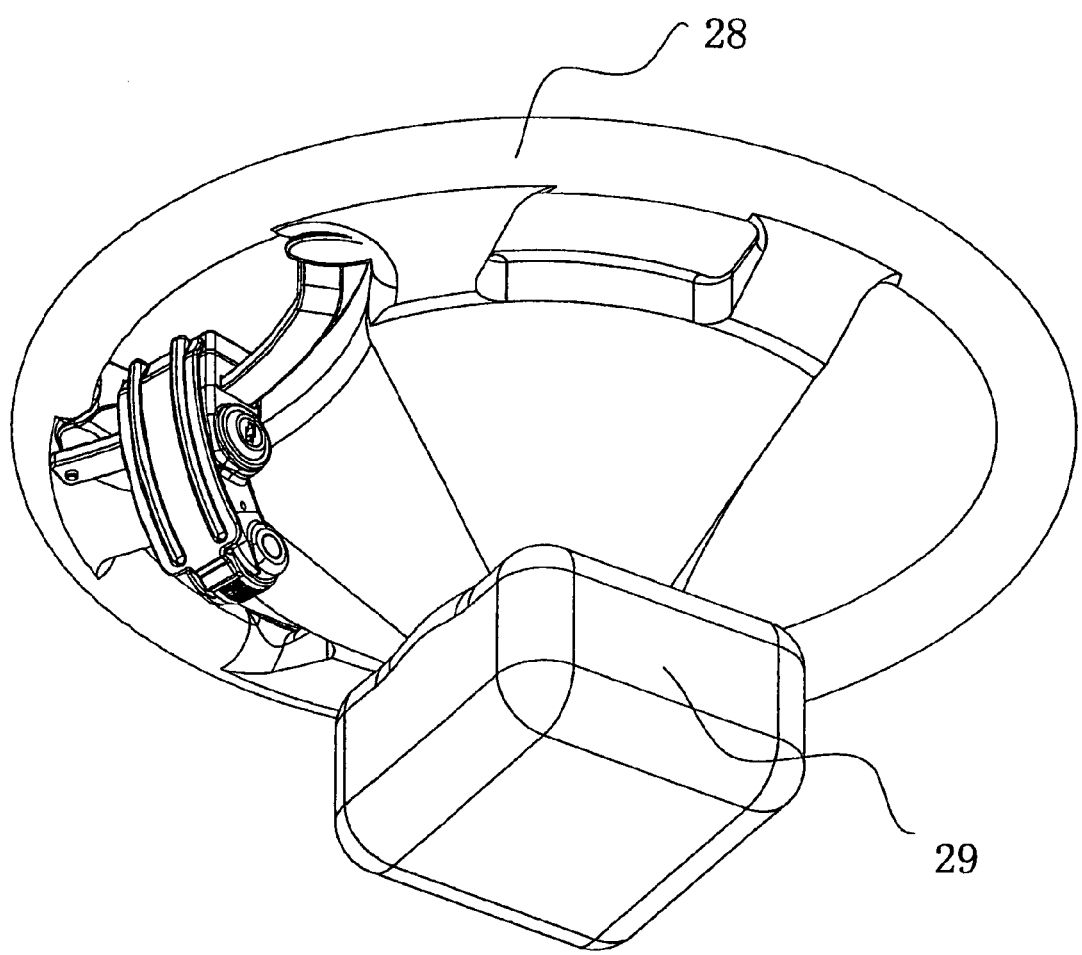
FIG. 20 is a perspective view of a car steering wheel locking structure of the present invention fixed and unlocked on a steering wheel.

Referring to FIG. 2, when the present invention is in a locked state, the card piece 7 is disposed in the width portion 25 of the cam 9. The card piece 7 is inclined due to the elasticity of the second spring 5. At the same time, the pull rod 4 can be pulled to make the first lock hook 1 and the second lock hook 3 hook the car steering wheel according to the size of the car steering wheel. When the second spring 5 is compressed during pulling the pull rod 4, the card piece 7 is in vertical state. At the same time, the cross-sectional area of the through hole 6 of the card piece 7 is maximum for the pull rod 4 to pass. Hence, it is easy for user to pull the pull rod 4. When the pull rod 4 cannot be pulled, the elasticity of the second spring 5 is forced on the card piece 7 in order to make the card piece 7 return to original inclined position. At the same time, the pull rod 4 can be pulled by a single direction. When the steel ball 16 is received in the first concave groove 18 of the cam 9, the claw portion 15a of the pawl 15 presses the ratch 12 due to the elasticity of the first spring 17 in order to make the ratch 12 move by a single direction. A face between the extending board 13 and a car steering wheel base 29 (as shown in FIG. 19) is a long and narrow face. The extending board 13 can be abutted against the car steering wheel base 29 in order to lock the steering wheel 28 (as shown in FIG. 19). At the same time, the extending board 13 is separated from the switch 19 of the warning device 2 in order to make the warning device 2 is in a warning state.

When a key inserts into the lock heart 10 and is rotated by 45 degrees, the card piece 7 is still in the width portion 25 of the cam 9. Hence, the pull rod 4 still can be moved by a single direction only. When the lock heart 10 is rotated over 45 degrees by the key, the steel ball 16 is separated from the first concave groove 18 of the cam 9 and the steel ball 16 presses the tail portion 15b of the pawl 15 to compress the first spring 17. At the same time, the pawl 15 can separate from the ratch 12, so that the extending board 13 can be rotated freely. Therefore, the extending board 13 can separate from the car steering wheel base 29.

When the lock heart 10 is rotated by 90 degrees, the card piece 7 is moved from the width portion 25 of the cam 9 to the narrow portion 27 of the cam 9 along the sliding face 26 and the card piece 7 is in a vertical state. At the same time, the cross-sectional area of the through hole 6 of the card piece 7 is maximum for the pull rod 4 to pass. Hence, it is easy for user to pull the pull rod 4 by two opposite directions.

The steel ball 16 is separated from the first concave groove 18 of the cam 9 by rotating the cam 9 and the steel ball 16 presses the tail portion 15b of the pawl 15 to compress the first spring 17. At the same time, the pawl 15 can separate from the ratch 12, so that the extending board 13 can be rotated freely. Because the card piece 7 can be moved by two opposite directions, the car steering wheel locking structure of the present invention can be disassembled from the steering wheel 28. At the same time, the extending board 13 can be folded to touch the switch 19 of the warning device 2 in order to make the warning device 2 being turned off.

Because the rotation unit of the key is 45 degrees, the lock body 8 has a second long hole 20. A third spring 21 and a positioning steel ball 22 are assembled in the second long hole 20. The cam 9 has three positioning holes 9a, 9b and 9c separated by 45 degrees. The positions of the three positioning holes 9a, 9b and 9c are different from the first concave groove 18. The positioning steel ball mates with the three positioning holes 9a, 9b and 9c. When the lock heart 10 is rotated by 45 degrees, the positioning steel ball 22 is moved from the first positioning hole 9a to the second positioning hole 9b; When the lock heart 10 is rotated by 45 degrees again, the positioning steel ball 22 is moved from the second positioning hole 9b to the third positioning hole 9c, in order to provide position effect.

Figure 21:
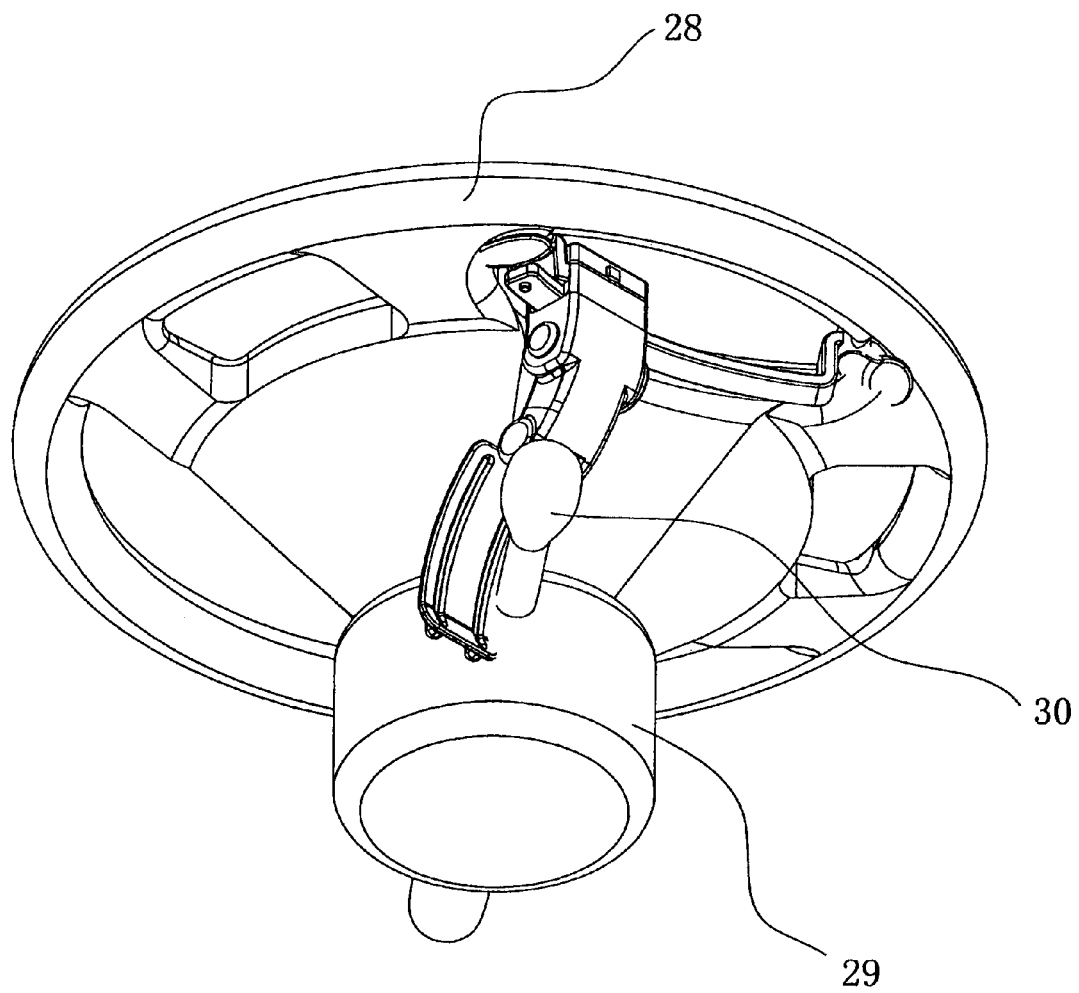
FIG. 21 is a perspective view of a car steering wheel locking structure of another embodiment of the present invention fixed and locked on a steering wheel.

In general, the shape of the car steering wheel base is irregular. In the present invention, the car steering wheel base has a rectangular shape. Referring to FIG. 21, if the shape of the car steering wheel base 29 is circular, the extending board 13 also can abut against the circular face of the car steering wheel base 29, and the extending board 13 can be positioned by a control rod 30. Therefore, the extending board 13 can be fixed in order to lock the steering wheel 28.

Although the present invention has been described with reference to the preferred best molds thereof, it will be understood that the invention is not limited to the details thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. A car steering wheel locking structure, comprising: a first lock hook, a second lock hook, a lock body, a lock heart, a pull rod, a cam, a ratch and a pawl, wherein the lock heart is assembled on the lock body, the first lock hook is fixed and assembled on the lock body, the second lock hook is assembled on the pull rod, the pull rod is movably assembled on the lock body, the cam is assembled in the lock body and connects with the lock heart, the ratch is assembled on one end of the lock body by a column pin, the ratch has an extending board, the pawl is assembled in the lock body by a fixing shaft, the pawl mates with the ratch, the lock body has a spring hole for receiving a first spring, one side of the first spring contacts with a claw portion of the pawl, and a tail portion of the pawl is driven to move by rotating the cam; the pull rod being movable along the lock body in a direction substantially parallel to an axis of the column pin.

2. A car steering wheel locking structure, comprising: a first lock hook, a second lock hook, a lock body, a lock heart, a pull rod, a cam, a ratch and a pawl, wherein the lock heart is assembled on the lock body, the first lock hook is fixed and assembled on the lock body, the second lock hook is assembled on the pull rod, the pull rod is movably assembled on the lock body, the cam is assembled in the lock body and connects with the lock heart, the ratch is assembled on one end of the lock body by a column pin, the ratch has an extending board, the pawl is assembled in the lock body by a fixing shaft, the pawl mates with the ratch, the lock body has a spring hole for receiving a first spring, one side of the first spring contacts with a claw portion of the pawl, and a tail portion of the pawl is driven to move by rotating the cam;

wherein the lock body has a card piece, the card piece has a through hole formed thereon, the pull rod passes through the lock body and the through hole, the cam is assembled in the lock body, one side of the card piece is disposed inside a groove of the cam, a second spring is disposed inside the lock body, and the second spring contacts with one side of the card piece.

3. The car steering wheel locking structure as claimed in claim 2, wherein the groove of the cam has a width portion and a narrow portion communicated with each other by a sliding face.

4. A car steering wheel locking structure, comprising: a first lock hook, a second lock hook, a lock body, a lock heart, a pull rod, a cam, a ratch and a pawl, wherein the lock heart is assembled on the lock body, the first lock hook is fixed and assembled on the lock body, the second lock hook is assembled on the pull rod, the pull rod is movably assembled on the lock body, the cam is assembled in the lock body and connects with the lock heart, the ratch is assembled on one end of the lock body by a column pin, the ratch has an extending board, the pawl is assembled in the lock body by a fixing shaft, the pawl mates with the ratch, the lock body has a spring hole for receiving a first spring, one side of the first spring contacts with a claw portion of the pawl, and a tail portion of the pawl is driven to move by rotating the cam;

wherein the lock body has a first long hole formed therein for receiving a plurality of steel balls, the cam has a first concave groove formed thereon, a steel ball mates with the concave groove, and a steel ball contacts the tail portion of the pawl.

5. The car steering wheel locking structure as claimed in claim 1, wherein the cam has a first concave groove formed thereon, a roller is disposed between the pawl and the cam, and a column surface of the roller mates with the concave groove of the cam and contacts the tail portion of the pawl.

6. The car steering wheel locking structure as claimed in claim 1, further comprising a warning device assembled on a top side of the lock body and the warning device having a switch, wherein when the extending board and the lock body are folded, the extending board contacts the switch in order to turn off the warning device.

\* \* \* \* \*